US008606457B2

(12) United States Patent
Odinak et al.

(10) Patent No.: US 8,606,457 B2
(45) Date of Patent: Dec. 10, 2013

(54) SYSTEM AND METHOD FOR ADAPTABLE MOBILE INTERFACE

(75) Inventors: Gilad Odinak, Bellevue, WA (US); Hakan Kostepen, Escondido, CA (US)

(73) Assignee: Promind Co., Ltd., Seoul (KR)

( * ) Notice: Subject to any disclaimer, the term of this patent is extended or adjusted under 35 U.S.C. 154(b) by 22 days.

(21) Appl. No.: 12/719,747

(22) Filed: Mar. 8, 2010

(65) Prior Publication Data
US 2011/0066314 A1 Mar. 17, 2011

Related U.S. Application Data

(63) Continuation of application No. 11/929,680, filed on Oct. 30, 2007, now abandoned, which is a continuation of application No. 10/970,841, filed on Oct. 20, 2004, now Pat. No. 7,551,994, which is a continuation of application No. 10/454,390, filed on Jun. 3, 2003, now abandoned, which is a continuation of application No. 09/955,475, filed on Sep. 17, 2001, now Pat. No. 6,591,168.

(60) Provisional application No. 60/316,650, filed on Aug. 31, 2001.

(51) Int. Cl.
*G06F 7/00* (2006.01)
*G06F 19/00* (2011.01)

(52) U.S. Cl.
USPC ............ 701/31.4; 701/457; 701/454; 701/29; 340/995.14; 340/995.15; 340/995.17

(58) Field of Classification Search
USPC ......... 701/29, 35, 207, 210.211, 31.457, 454; 340/995.14, 995.15, 459, 995.1, 340/995.17, 995.24, 990, 995.21
See application file for complete search history.

(56) References Cited

U.S. PATENT DOCUMENTS

| | | |
|---|---|---|
| 5,168,277 A | 12/1992 | LaPinta et al. |
| 5,177,685 A | 1/1993 | Davis et al. |

(Continued)

FOREIGN PATENT DOCUMENTS

| | | |
|---|---|---|
| DE | 19516647 A1 | 11/1996 |
| DE | 10105394 A1 | 8/2001 |

(Continued)

OTHER PUBLICATIONS

Eco-Routing Navigation System Based on Multisource Historical and Real-Time Traffic Information; Boriboonsomsin, K. ; Barth, M.J.; Weihua Zhu ; Vu, A.; Intelligent Transportation Systems, IEEE Transactions on; vol. 13 , Issue: 4 Digital Object Identifier: 10.1109/TITS.2012.2204051; Publication Year: 2012 , pp. 1694-1704.*

(Continued)

*Primary Examiner* — Cuong H Nguyen
(74) *Attorney, Agent, or Firm* — McKenna Long & Aldridge

(57) ABSTRACT

A system, method, and computer program product for automatically adjusting the output of presentation content based upon vehicle conditions. The method determines whether one of a plurality of vehicle conditions exists, such as conditions related to vehicle speed, rate of change in vehicle speed, rate of change in vehicle direction, vehicle emergencies, cellular phone or headphone activation, radar detector activation, noise level decibels above a certain value, etc. The method determines an output format based on the determined vehicle conditions. The method outputs at least a portion of the presentation content based on the determined output format. The determined output format includes display format information, such as text font or icon size information or map detail. The presentation content can also include audio content.

19 Claims, 3 Drawing Sheets

(56) References Cited

U.S. PATENT DOCUMENTS

| | | | |
|---|---|---|---|
| 5,243,528 A * | 9/1993 | Lefebvre | 701/211 |
| 5,815,160 A | 9/1998 | Kikuchi et al. | |
| 5,995,895 A | 11/1999 | Watt et al. | |
| 6,131,060 A * | 10/2000 | Obradovich et al. | 701/49 |
| 6,144,920 A * | 11/2000 | Mikame | 701/455 |
| 6,157,342 A * | 12/2000 | Okude et al. | 342/357.3 |
| 6,163,752 A | 12/2000 | Sievers et al. | |
| 6,240,365 B1 | 5/2001 | Bunn | |
| 6,275,231 B1 | 8/2001 | Obradovich | |
| 6,278,383 B1 * | 8/2001 | Endo et al. | 340/995.14 |
| 6,296,280 B1 | 10/2001 | Struble et al. | |
| 6,330,497 B1 * | 12/2001 | Obradovich et al. | 701/1 |
| 6,351,706 B1 * | 2/2002 | Morimoto et al. | 701/431 |
| 6,381,534 B2 | 4/2002 | Takayama et al. | |
| 6,389,332 B1 | 5/2002 | Hess | |
| 6,459,961 B1 * | 10/2002 | Obradovich et al. | 701/1 |
| 6,459,967 B1 * | 10/2002 | Otto | 701/29 |
| 6,577,928 B2 * | 6/2003 | Obradovich | 701/1 |
| 6,591,168 B2 | 7/2003 | Odinak et al. | |
| 6,601,233 B1 * | 7/2003 | Underwood | 717/102 |
| 6,603,407 B2 * | 8/2003 | Endo et al. | 340/995.14 |
| 6,609,128 B1 * | 8/2003 | Underwood | 707/610 |
| 6,633,878 B1 * | 10/2003 | Underwood | 1/1 |
| 6,658,344 B2 | 12/2003 | Hirasago | |
| 6,697,824 B1 * | 2/2004 | Bowman-Amuah | 709/229 |
| 6,806,887 B2 | 10/2004 | Chernock et al. | |
| 6,850,252 B1 | 2/2005 | Hoffberg | |
| 6,868,525 B1 * | 3/2005 | Szabo | 715/738 |
| 6,904,449 B1 * | 6/2005 | Quinones | 709/203 |
| 6,975,932 B2 | 12/2005 | Obradovich | |
| 7,181,438 B1 * | 2/2007 | Szabo | 1/1 |
| 7,330,786 B2 | 2/2008 | Odinak et al. | |
| 8,032,298 B2 * | 10/2011 | Han | 701/455 |
| 8,209,120 B2 * | 6/2012 | Breed | 701/450 |
| 2002/0133285 A1 | 9/2002 | Hirasago | |
| 2002/0171670 A1 | 11/2002 | Clernock et al. | |
| 2005/0273262 A1 | 12/2005 | Kawakami et al. | |
| 2006/0015240 A1 | 1/2006 | Shima | |
| 2006/0015241 A1 | 1/2006 | Shima | |
| 2006/0206243 A1 | 9/2006 | Pawlicki et al. | |
| 2007/0005218 A1 | 1/2007 | Ueyama | |
| 2008/0243375 A1 * | 10/2008 | Han | 701/208 |

FOREIGN PATENT DOCUMENTS

| | | | |
|---|---|---|---|
| EP | 0829704 A | 3/1998 | |
| EP | 1049051 A | 11/2000 | |

OTHER PUBLICATIONS

Preliminary study of behavioral and safety effects of driver dependence on a warning system in a driving simulator; Yamada, K. ; Kuchar, J.K.; Systems, Man and Cybernetics, Part A: Systems and Humans, IEEE Transactions on; vol. 36 , Issue: 3 Digital Object Identifier: 10.1109/TSMCA.2006.871646; Publication Year: 2006 , pp. 602-610.*

Unsupervised and incremental speaker adaptation under adverse environmental conditions; Takagi, K. ; Shinoda, K. ; Hattori, H. ; Watanabe, T.; Spoken Language, 1996. ICSLP 96. Proceedings., Fourth International Conference on; vol. 4 Digital Object Identifier: 10.1109/ICLSP.1996.607211; Publication Year: 1996 , pp. 2079-2082 vol. 4.*

Development of circumstance-based variable information structure for head up display in a car; Park Min Hee ; Kim Hyun Jeong ; Lee Kwang Hyun; Data Mining and Intelligent Information Technology Applications (ICMiA), 2011 3rd International Conference on Publication Year: 2011 , pp. 127-130.*

James Raymond Davis and Julia Hirschberg. "Assigning Intonational Features in Synthesized Spoken Directions." Proceedings of the 26th Annual Meeting of the Association for Computational Linguistics, ACL, Buffalo, NY, pp. 7-10, 1988, pp. 187-193.

James Raymond Davis and Chris Schmandt. Discourse Stratgies for Conversation in Time. 6pp. ND.

James Raymond Davis. Let Your Fingers do the Spelling: Implicit disambiguation of words spelled with the telephone keypad. The Media Laboratory, Massachusetts Institute of Technology, E15-325. 9pp. ND.

James Raymond Davis. "A voice inerface to a Direction giving program." Speech Research Group Technical Memo 2, THe Media Laboratory, Massachusetts Institute of Technology, 10 pp. Jan. 1987.

James Raymond Davis and Chris Schmandt. "The Backseat Driver: Real Time Spoken Drive Instructions." The Media Laboratory, Massachusetts Institute of Technology. CH 2789-6/89/0000-0146$1.00 1989 IEEE.

Christopher M. Schmandt and James Raymond Davis. "Synthetic Speech for Real Time Direction-Giving." IEEE Transactions on Consumer Electronics, vol. 35, No. 3, Aug. 1989, pp. 649/653.

James Raymond Davis. "Back Seat Driver: voice assisted automobile navigation." Thesis submitted to the Media Arts & Sciences Section in partial fulfillment of the requirements for the Degree of Doctor of Philosophy at the Massachusetts Institute of Technology, Sep. 1998, 165pp.

* cited by examiner

SYSTEM AND METHOD FOR ADAPTABLE MOBILE INTERFACE

The following application is a continuation of and claims priority to U.S. patent application Ser. No. 11/929,680 filed Oct. 30, 2007, which is a continuation of U.S. patent application Ser. No. 10/970,841 filed Oct. 20, 2004, which is a continuation of Ser. No. 10/454,390 filed Jun. 3, 2003, which is a continuation of Ser. No. 09/955,475 filed Sep. 17, 2001 (U.S. Pat. No. 6,591,168 issued Jul. 28, 2003 which claims priority to U.S. Provisional No. 60/316,650 filed Aug. 31, 2001 and are incorporated by reference in their entirety herein.

FIELD OF THE INVENTION

This invention relates generally to the field of vehicle user interfaces.

BACKGROUND OF THE INVENTION

Various vehicle devices exist that are designed to provide a vehicle operator with travel-related information. For example, a display coupled to a global positioning system (GPS) may be used to present to the vehicle operator a detailed map showing the vehicle location, a desired destination, and the geographic details of the surrounding area. Under certain situations, the vehicle operator has the opportunity to study the map in exact and thorough detail. An example is a parked vehicle. There are other times, however, when the vehicle operator is too busy operating the vehicle to safely view the displayed information, let alone study the displayed information in exacting detail. This is particularly the case where the vehicle operator is in the midst of a particularly taxing circumstance, for example, driving in heavy traffic, driving at high speed, or otherwise distracted by an emergency situation or telephone conversation. In such situations, the display presentation distracts the vehicle operator because the operator focuses attention on the details shown on the display.

Therefore, there exists a need to provide valuable and timely travel-related information to a vehicle operator while minimizing potentially dangerous distractions to the vehicle operator.

SUMMARY OF THE INVENTION

The present invention is a system, method, and computer program product for automatically adjusting the output of presentation content to a user based upon one or more vehicle conditions. The method includes receiving presentation content for output to a vehicle operator or other system user that may include display format information in a particular text font or icon size, map detail, or audio content. The method determines whether one of a plurality of vehicle conditions exists, including conditions related to vehicle speed, rate of change in vehicle speed, rate of change in vehicle direction, vehicle emergencies, cellular phone or headphone activation, radar detector activation, noise level decibels above a certain value, etc. A vehicle emergency condition could indicate events ranging from anti-lock braking system activation to radiator overheating to outside temperature variations that correlate to icy road conditions. The method determines an output format for the presentation content based on the determined vehicle condition. Then, the method outputs at least a portion of the presentation content based on the determined output format.

In accordance with still further aspects of the invention, the content is received from a server over a network link. At least a portion of the network link is a wireless link.

As will be readily appreciated from the foregoing summary, the invention provides a method for automatically adjusting output content based on current vehicle conditions.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

The present invention provides a system, method, and computer program product for modulating output over output devices (e.g., display, speakers) based on present vehicle conditions (e.g., speed, rate of change in speed or direction, emergencies). When the system determines that the vehicle requires a more attentive operator, the method of the present invention manipulates the format of information and content presented to the vehicle operator via the output devices.

Figure 1:
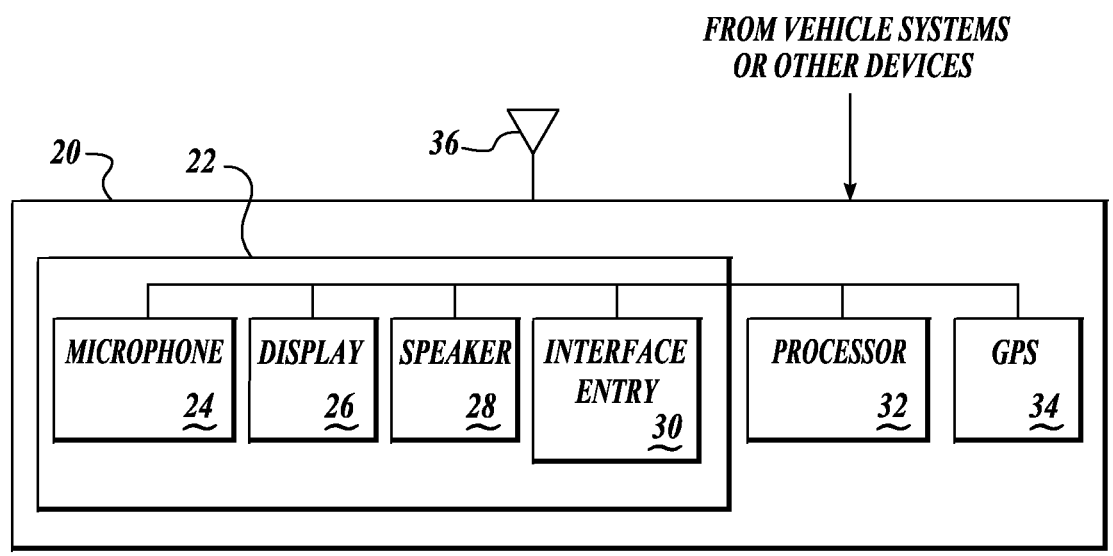
FIG. 1 is a block diagram illustrating the components of the present invention.

FIG. 1 shows a system 20 within a vehicle for performing the present invention. System 20 includes a user interface 22 having a microphone 24 for capturing the user's voice; a display 26; speakers 28; and an interface entry 30 for allowing the user to perform various interactive functions. System 20 also includes a processor 32; a global positioning system (GPS) 34 for determining precise vehicle locations; and a communications device 36, such as a cellular modem, for transmitting and receiving wireless information. System 20 is also coupled to receive information from other vehicle systems (not shown), such as a speedometer, an engine, or a braking system.

Figure 2:
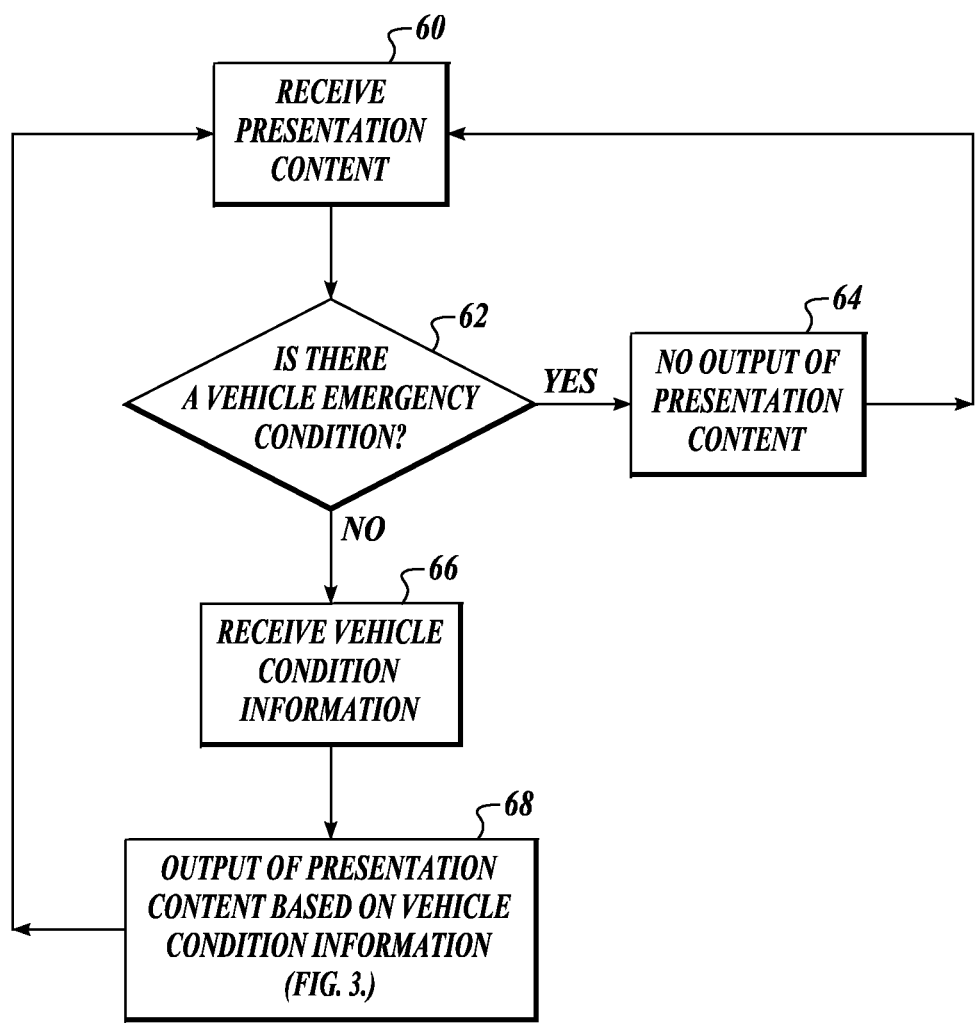
FIG. 2 is a flow chart illustrating the present invention performed by the device shown in FIG. 1.

FIG. 2 illustrates a preferred process performed by system 20 illustrated in FIG. 1. At block 60, system 20 and, more specifically, processor 32, receives presentation content. The presentation content is preferably received at communications device 36 from a server transmitted over a network (not shown). At decision block 62, processor 32 determines if any vehicle emergency condition exists based on information received from the other vehicle systems. If processor 32 determines that a vehicle emergency condition exists, processor 32 stops all output of received presentation content to any one of the components of user interface 22 (block 64). Examples of a vehicle emergency condition that may cause the processor to stop output presentation content to user interface 22 are signals received from the engine that indicate engine overheating or a signal that indicates the operator has applied brakes to the point where an anti-braking system is activated.

Figure 3:
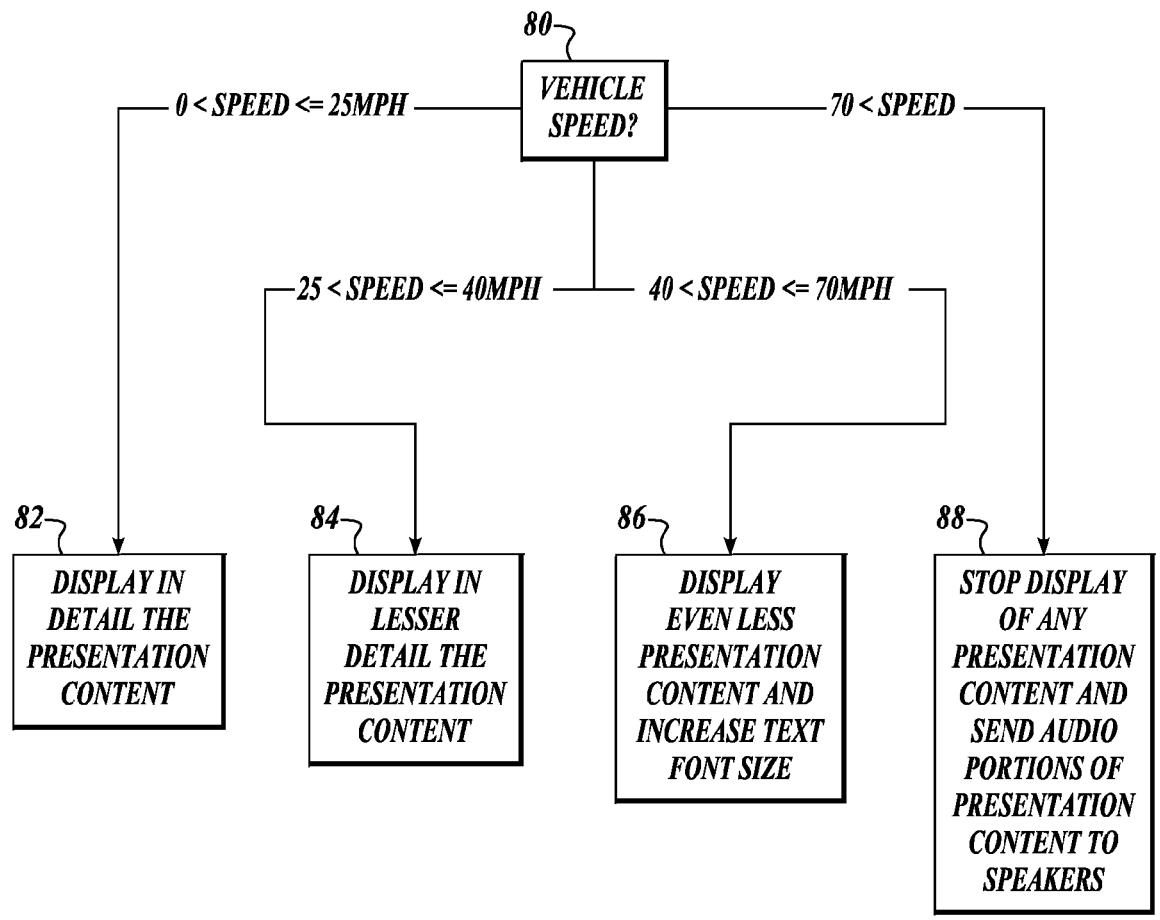
FIG. 3 is a flow chart illustrating the operation of a specific example of the present invention.

If, at decision block 62, processor 32 determines that there is not a vehicle emergency condition, processor 32 receives vehicle condition information (block 66). The vehicle condition information comes from a number of sources that generate signals, such as GPS 34 or a speedometer. At block 68, processor 32 outputs presentation content through user interface 22 based on the vehicle condition information. This step involves determining the substance and format of the presentation content to display on display 26 or broadcast on speakers 28 of user interface 22. For example, when the vehicle is parked, processor 32 presents all or nearly all of the received presentation content. As the vehicle condition changes, for example, the vehicle picks up speed, processor 32 changes the presentation content information that is shown on display 26. The change in presentation content may also involve shifting presentation of information from visual display to audio broadcast as output through speakers 28. In one example, the presented content is a full detailed map of the vehicle's location that includes directions to a previously requested destination. Based on the vehicle speed, or the rate of change in vehicle speed or direction, the detail shown on the map will be altered. As the vehicle speed increases, the detail shown on the map is reduced, for example, to include only the vehicle's present location in relation to nearby streets or intersections. Some or all of the presentation content, or map directions, may be translated to audio format and broadcast to the vehicle operator via speakers 28. In other examples, change in vehicle condition may result in alteration of the font or size of text, icons and graphics presented on the display, as well as increased or decreased audio broadcast. FIG. 3 illustrates an example, based on vehicle speed, of how processor 32 changes the output that is presented over user interface 22.

After blocks 64 and 68, processor 32 returns to block 60 to continue receiving more presentation content. In this embodiment, presentation content is processed in real-time from the time of reception from the server over the network to the output of presentation content to a vehicle operator through user interface 22. In an alternate embodiment, the presentation content can be received all at one time and stored by processor 32 before any determination is made of how to present the output. In another alternate embodiment, if another person other than the vehicle operator wishes to view the presentation content, presented output is set to whatever level of detail is desired.

FIG. 3 illustrates an example of the process performed at block 68 of FIG. 2. At block 80, vehicle speed information is determined, for example by reference to the vehicle speedometer. If the vehicle's speed is less than or equal to 25 mph, processor 32 generates a detailed display to present on display 26 of user interface 22 (block 82). As the speed of the vehicle increases, the amount of detailed visual information generated for display is reduced. Thus, if the vehicle speed is greater than 25 mph but less than or equal to 40 mph, processor 32 generates a display with less visual information than was generated for vehicle speeds of less than or equal to 25 mph (block 84). When the speed is greater than 40 mph but less than or equal to 70 mph, processor 32 reduces not only the amount of detail to be displayed on display 26, but also increases the font size of any text included in the displayed presentation content and changes the color to make it easier for an operator to view (block 86). When the speed is greater than 70 mph, processor 32 stops generating display information for presentation on display 26 and switches to a pure audio presentation for output over the speakers 28 (block 88). The specific speed ranges described are exemplary only. The exact trigger speeds may vary according to various factors, such as road conditions, vehicle specification, vehicle operator skill, etc., as well as user preference. Likewise, the output format of the presentation content may be varied according to user interface hardware or software constraints as well as user preference.

In addition to the example described above with reference to overall vehicle speed, presentation content can be automatically adjusted based upon one or more vehicle conditions related to rate of change in vehicle speed, rate of change in vehicle direction, cellular phone or headphone activation, radar detector activation, noise level decibels above a certain value, radio/CD player in use, TV/DVD console in use, turn signal, etc. The vehicle conditions are determined by vehicle systems, such as the vehicle speedometer, steering, engine, and braking and acceleration systems. Vehicle systems may also include additional components, such as temperature, humidity, wind speed and precipitation gauges, a compass, clock, etc. These additional vehicle system components may be integrated with or separate from system 20, so long as they are capable of being monitored by system 20. The method of the present invention automatically adjusts the output of presentation content based upon a monitor of these vehicle conditions, or a combination of these vehicle conditions. For example, system 20 monitors vehicle braking and acceleration systems with reference to an internal clock to determine the rate of change of vehicle speed. If vehicle speed is increasing or decreasing rapidly, system 20 automatically reduces the amount of detail provided in visual presentation content, and may transfer some or all of the content to audio presentation. In another example, system 20 monitors movement of the steering wheel and vehicle direction with reference to a compass and a clock to determine rate of change of vehicle direction. If vehicle direction is changing rapidly, system 20 would again automatically reduce the amount of detail provided in visual presentation content, as well as transfer some or all of the content to audio presentation.

While the preferred embodiment of the invention has been illustrated and described, as noted above, many changes can be made without departing from the spirit and scope of the invention. For example, as noted above, the trigger event or threshold used to determine the output format for presentation content, as well as the specific output format, might vary according to different factors as well as user preference. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for automatically adjusting output content responsive to one or more vehicle conditions, the method comprising:

receiving at a processor content for output;

determining at the processor if a vehicle emergency condition exists based on information received from a braking system, including information comprising an indication that an anti-braking system is activated;

stopping the output of the received content if it is determined that a vehicle emergency exists;

determining at the processor a vehicle condition, if it is determined that a vehicle emergency condition does not exist;

changing a display format of the content for output and the amount of content for output based on the determined vehicle condition, wherein changing the display format of the content for output and the amount of content for output includes, determining the display format based on the determined vehicle condition; and outputting at least a portion of the received output content based on the determined display format, wherein the content for output includes map detail information and wherein the amount of content for output displayed decreases as the determined vehicle condition progresses.

2. A non-transitory computer program product including executable steps on a storage medium for automatically adjusting output content, wherein execution of the program by a processor of a computer system causes the processor to carry out the executable steps of:

receiving content for output;

determining if a vehicle emergency condition exists based on information received from a braking system, including information comprising an indication that an anti-braking system is activated;

stopping the output of the received content if it is determined that a vehicle emergency exists;

determining a vehicle condition, if it is determined that a vehicle emergency condition does not exist;

changing a display format of the content for output and the amount of content for output based on the determined vehicle condition, wherein the means for changing the display format for output and the amount of content for output includes, determining the display format based on the determined vehicle condition; and outputting at least a portion of the received output content based on the determined display format, wherein the content for output includes map detail information and wherein the amount of content for output displayed decreases as the determined vehicle condition progresses.

3. The method of claim 1, wherein the display format comprises text font size.

4. The method of claim 1, wherein the display format comprises icon size.

5. The method of claim 2, wherein the means for determining a vehicle condition comprises a means for determining rate of change in vehicle direction.

6. The method of claim 1, wherein the received content comprises audio content.

7. The method of claim 1, wherein receiving content comprises receiving the content from a server over a network link.

8. The method of claim 7, wherein at least a portion of the network link is a wireless link.

9. The method of claim 2, wherein the means for determining a vehicle condition comprises a means for determining rate of change in vehicle speed.

10. The method of claim 1, wherein determining a vehicle condition comprises determining vehicle speed.

11. The method of claim 1, wherein determining a vehicle condition comprises determining rate of change in vehicle speed.

12. The method of claim 1, wherein determining a vehicle condition comprises determining rate of change in vehicle direction.

13. The computer program product of claim 2, wherein the means for receiving content comprises a means for receiving the content from a server over a network link.

14. The computer program product of claim 13, wherein at least a portion of the network link is a wireless link.

15. The computer program product of claim 2, wherein the display format comprises text font size.

16. The method of claim 2, wherein the display format comprises icon size.

17. The computer program product of claim 2, wherein the means for determining a vehicle condition comprises a means for determining vehicle speed.

18. The computer program product of claim 2, wherein the received content comprises audio content.

19. An apparatus for automatically adjusting output content, the apparatus comprising:

a receiver configured to receive content for output;

a user interface; and a processor coupled to the receiver and the user interface, the processor comprising:

a first component configured to determine if a vehicle emergency condition exists based on information received from a braking system, including information comprising an indication that an anti-braking system is activated, to stop output of the received content if it is determined that a vehicle emergency exists and to determine a vehicle condition, if it is determined that a vehicle emergency condition does not exist;

a second component configured to change a display format of the content for output and the amount of content for output based on the determined vehicle condition, by determining the display format based on the determined vehicle condition; and a third component configured to output at least a portion of the received output content to the user interface based on the determined display format, wherein the amount of content for output displayed decreases as the determined vehicle condition progresses.

* * * * *